United States Patent [19]

Sharp

[11] 4,244,548

[45] Jan. 13, 1981

[54] MIRROR CLAMPING ASSEMBLY

[75] Inventor: Bernard C. Sharp, White Plains, N.Y.

[73] Assignee: Parker-Hannifin Corporation, Shelton, Conn.

[21] Appl. No.: 55,601

[22] Filed: Jul. 9, 1979

[51] Int. Cl.³ .............................................. A47G 1/24
[52] U.S. Cl. .................................... 248/481; 403/143
[58] Field of Search ........................ 248/481, 482, 484; 403/135, 137, 142, 143; 74/501 M; 350/307

[56] References Cited

U.S. PATENT DOCUMENTS

| 1,386,959 | 8/1921 | Severance | 403/143 X |
| 2,089,463 | 8/1937 | Ritz-Woller | 248/481 |
| 2,588,825 | 3/1952 | Goodman et al. | 248/481 X |
| 2,613,575 | 10/1952 | Falge | 248/481 |
| 2,763,188 | 9/1956 | Bertell | 248/484 |
| 3,575,375 | 4/1971 | Strem | 248/481 |
| 3,603,555 | 9/1971 | Lohr | 248/481 |

FOREIGN PATENT DOCUMENTS

| 1963460 | 7/1971 | Fed. Rep. of Germany | 350/307 |
| 2258296 | 6/1973 | Fed. Rep. of Germany | 74/501 M |

*Primary Examiner*—J. Franklin Foss
*Attorney, Agent, or Firm*—Albert C. Johnston; Louis H. Reens

[57] ABSTRACT

An improved ball joint structure for clamping a rear view mirror head tightly yet turnably on a supporting ball member includes a ball seat member and a body clamping member fixed at the outer and inner sides of housing wall portions bordering an opening in which a mirror supporting ball is disposed, a ball clamping member mounted on the body clamping member and having a contoured portion to grip the inner side of the ball, and means adjustable from outside the wall for holding the ball clamping member under a desired tension against the ball. The body and ball clamping members have coacting formations that limit displacement of the ball clamping member in the direction away from the ball.

8 Claims, 4 Drawing Figures

U.S. Patent Jan. 13, 1981 4,244,548
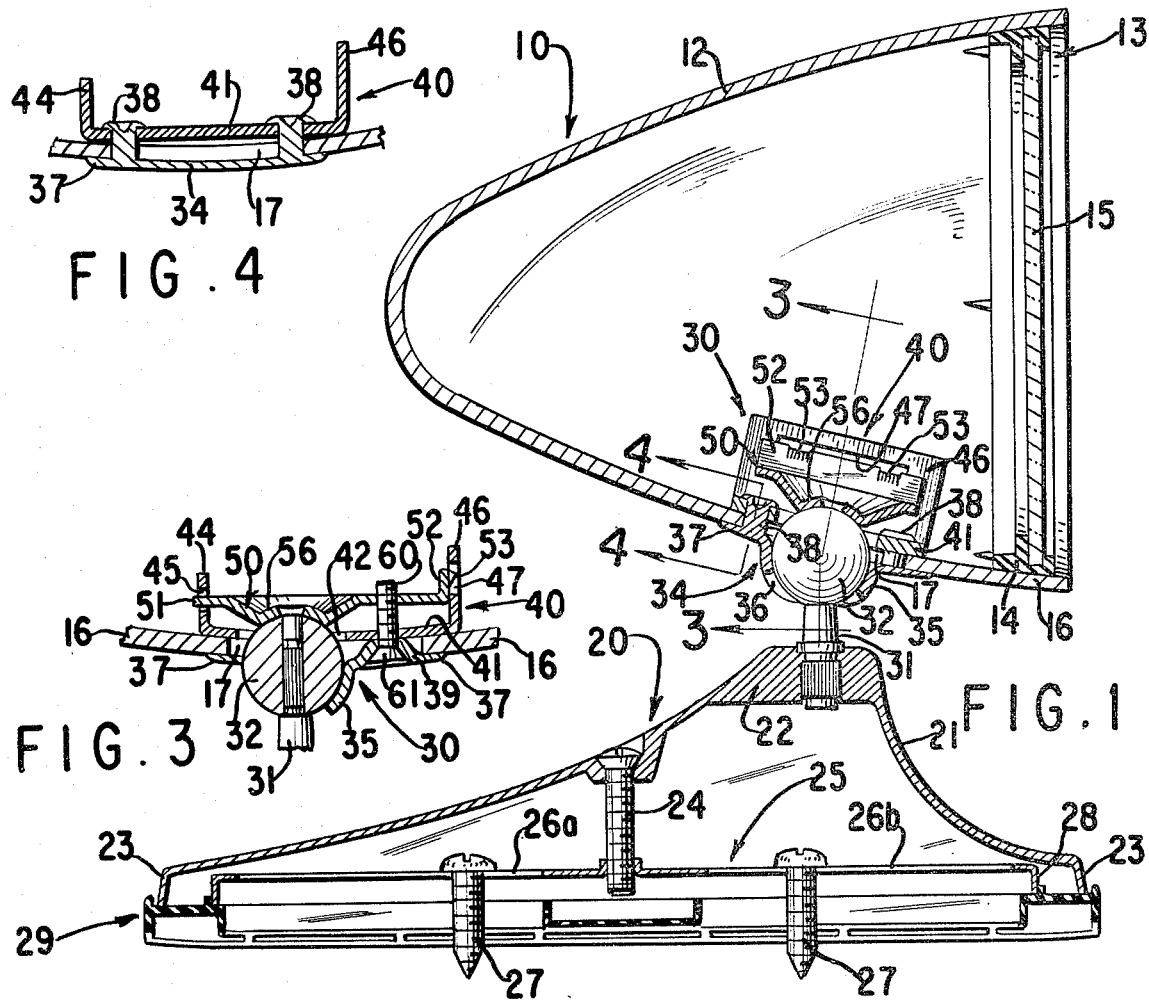
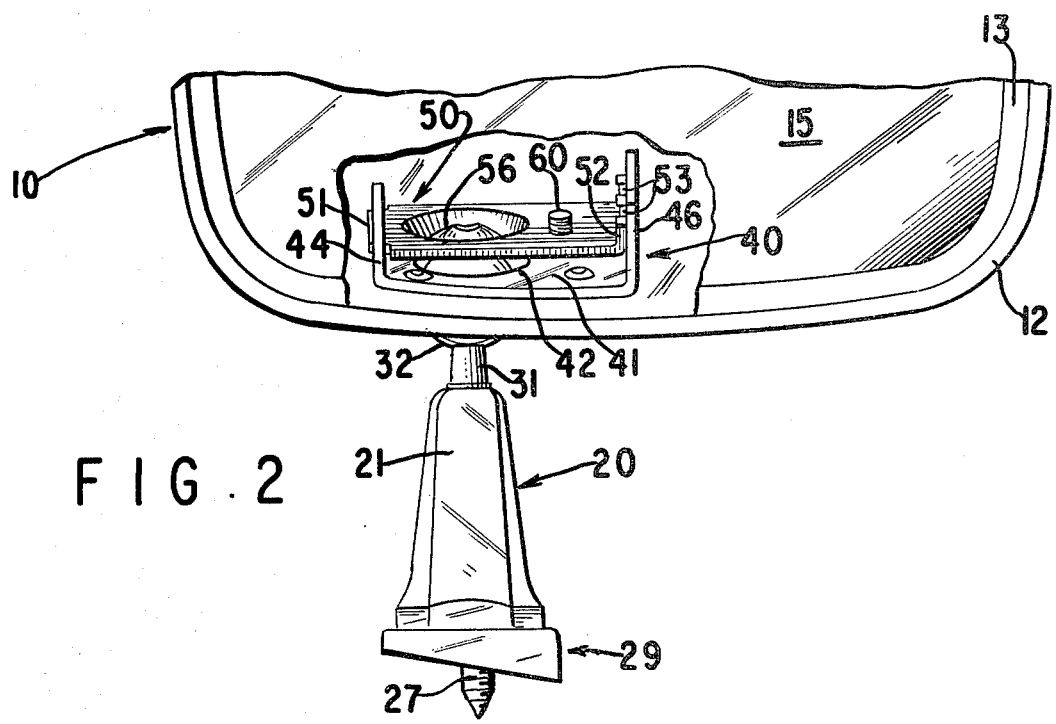

MIRROR CLAMPING ASSEMBLY

This invention relates to a mirror clamping assembly and, more particularly, to a ball joint structure for clamping a rear view mirror head tightly yet turnably on a supporting ball member.

Automobiles usually have one or more external rear view mirrors mounted on the car body. Such mirrors are subject to adverse weather conditions, wind and vibrations. Each mirror typically is supported adjustably on a mounting device fixed to the car body. It is common to join the mirror head, or housing, to the mounting device by a swivel or ball joint so that the mirror can be set angularly to a position compatible with the field of vision of any driver.

It is important that the ball joint be one which will securely and tightly clamp the mirror housing in a desired position yet will keep the housing turnable whenever desired for adjusting the position of the mirror. Various structures have been proposed and/or used for this purpose, among which are those disclosed in U.S. Pat. Nos. 2,726,575, 2,789,464, 3,000,263, 3,191,498, 3,235,294, 3,338,545 and 3,603,555.

The known ball joint structures are disadvantageous in one or more several practical respects. Many of them require the mirror housing to be made with special formations serving as part of the ball joint, thus requiring a particular housing configuration. Some of them have no provision for adjusting the tension applied to the ball member of the joint; so the mirror head may become too loose or too tight, incorrectably, under various weather or other use conditions. Some of them include a tension adjustment screw that can be turned to tighten the ball joint but have parts of the joint so arranged that a part may be lost or will be difficult or impractical to re-assemble if the adjustment screw should loosen or fall off the structure due to vibration or other conditions encountered in the use of automobile mirrors.

It is the principal object of the present invention to provide an improved ball joint assembly for clamping a mirror head or housing on a supporting ball member, which requires no special housing formation other than an opening through the housing wall, provides for easy external adjustment of the tension applied to the ball of the supporting member, and has its parts so secured that they stay in assembled position even if a device for adjusting the tension should become loose or detached.

The clamping ball joint assembly of the invention holds a body such as a housing forming a mirror head tightly yet turnably positioned on a supporting member carrying a ball disposed in an opening formed through a wall of the body. The assembly includes a ball seat member that cradles the outer side of the ball and is fixed against the outer side of the body wall and a body clamp which is fixed against the inner side of the wall, together with a ball clamping member at said inner side and means adjustable from outside the body for holding this clamping member under a desired tension against the inner side of the ball. Co-acting means on the body clamp and the ball clamping member prevent displacement of the latter away from a position for engagement with the tensioning means and the ball.

In preferred embodiments of the invention, the body clamp comprises a substantially rigid bracket having upstanding leg portions extending from a base portion of the bracket at opposite sides of the wall opening in which the ball is disposed. A related ball clamping member comprises a substantially rigid yet resilient pressure plate having a portion thereof contoured to fit against the ball, with one end of this plate pivotably engaging one of the legs of the body clamp bracket and the opposite plate end engaged with the other bracket leg but displaceable relative to it for tensioning the plate in the direction toward the body wall. The adjustable means for holding the ball clamping member under tension comprise a screw that extends from a head outside the body wall through openings in the ball seat member and the base portion of the body clamp bracket and is threaded in an opening in the pressure plate at a location between the contoured portion and the displaceable end of this plate. The displaceable plate end is formed with a lip that protrudes laterally into a clearance opening formed in the adjacent bracket leg, so that the lip will butt against an upper margin of the clearance opening, thus limiting displacement of the pressure plate in the direction away from the ball, upon loosening or removal of the tensioning screw.

According to a further feature of the invention, the ball seat member and the base portion of the body clamp bracket are joined together against the opposite sides of portions of the body wall that border the wall opening in which the ball is disposed, thus tightly sandwiching these wall portions to provide a structurally integrated assembly. The seat member and bracket base preferably are so joined together by rivets which extend between them in corners of the wall opening. A single opening formed in the wall of a mirror housing suffices for assembling the housing with a supporting ball member according to this invention.

The above mentioned and other objects, feature and advantages of the invention will be further apparent from the following detailed description and the accompanying drawings of an illustrative embodiment of the invention. In the drawings:

FIG. 1 is a cross-sectional view of a rear view mirror assembly embodying a ball joint structure according to the invention;

FIG. 2 is a front elevational view, partly broken away, of the assembly shown in FIG. 1;

FIG. 3 is a cross-sectional view of the ball joining structure taken along line 3—3 in FIG. 1; and FIG. 4 is a cross-sectional view of a portion of the structure, taken along line 4—4 in FIG. 1.

The mirror assembly shown in FIG. 1 includes a rear view mirror body or head 10 which is joined tightly yet turnably to a mirror mounting structure 20 by a ball joint and a clamping assembly generally indicated at 30.

The body or head 10 comprises a wall 12 formed to a desired housing configuration having an open side at 13 where it receives and holds securely a mirror frame 14 supporting a mirror glass 15. A lower portion 16 of wall 12 has an opening 17 formed through it to accommodate a supporting ball 32 and some other parts of the ball joint structure. The opening 17 may be simply a substantially rectangular, or square, opening cored or cut out of the body wall, which preferably is a molded plastic wall.

The mirror mounting structure 20 may be of any known form suitable for being fastened at a desired location onto a vehicle body and for securely holding a suitable mirror supporting ball member such as a stud 31 having the ball 32 fixed on its upper or free end. The illustrated mounting structure includes a mirror base 21 having a top portion 22 in which the stud 31 is fixed tightly and having a body portion that covers and is fastened to an elongate mounting bracket 25. The mounting bracket 25 is centrally slotted at 26a and 26b to receive mounting screws 27. It comprises a bordering side flange 28 that is seated on an inner ledge of an elastic mounting pad 29. The mirror base 21 has a bordering side flange 23 seated on an outer ledge of the same mounting pad. The bracket 25 is first fastened onto the pad 29 and a vehicle body by engagement of the screws 27, and then the mirror base is placed over the bracket and is fastened to it by a screw 24 so that the base flange 23 presses the outer portion of the pad 29 against the surface to which the pad and bracket are mounted.

The ball joint and clamping assembly 30 comprises four principal parts in addition to the supporting ball member, namely: a ball seat member 34, a body clamping member 40, a ball clamping member 50 mounted on portions of member 40, and an adjustable tensioning screw 60.

The ball seat member 34 is a rigid piece formed with a spherically concave portion 35 to receive and cradle the outer side of the ball 32, and with substantially flat bordering portions 37 which bear and are fixed against the outer side of portions of the body wall at 16 that border the opening 17. The concave, ball cradling portion 35 has an opening 36 in its base through which the ball stud 31 extends to the mirror base top 22. The opening 36 is made large enough to accommodate the required angular adjustability of the mirror head relative to the stud 31.

The body clamping member 40 is formed to bear and be fixed against the inner side of portions of the body wall at 16 that border the wall opening 17. Member 40 in the form shown is a substantially rigid bracket having a base portion 41 extending to opposite sides of opening 17 and having legs 44 and 46 turned up from opposite ends of the base portion. An opening 42 in the base portion allows the inner side of the ball 32 seated in member 34 to protrude freely through the base portion for engagement by the ball clamping member 50.

In the present preferred embodiment, the ball seat member 34 and the base portion 41 of the body clamping member 40 are fixed against the outer and inner sides respectively of the body wall portions that border the opening 17, by being joined together with those wall portions sandwiched between them. Members 34 and 40 are so joined by rivets 38 which extend from member 34 through the opening 17 at corners of this opening and pass through and are headed over rivet openings formed in the base portion 41 of member 40. See FIG. 4.

The ball clamping member 50 in the illustrated embodiment is formed as a substantially rigid yet resilient pressure plate that extends and is supported between the upstanding legs 44 and 46 of the body clamping member 42. One end of the plate 50 is engaged pivotably with leg 44, as by being formed with a tongue 51 fitting into a slot 45 formed in that leg. The opposite end of the plate 50 is engaged loosely with the other leg 46 of the body clamp member, so as to be displaceable relative to leg 46 in the direction toward the base portion 41, i.e. toward the ball 32 and the bordering body wall at 16. For this purpose the plate 50 may be formed with an upturned end 52 from which a lip 53 is stuck out to protrude laterally into a clearance opening 47 formed in leg 46. The lip 53 has a limited range of free motion in the clearance opening 47. If the pressure plate, or ball clamping member, is not being held under tension the upper edge of lip 53 as seen in FIG. 3 will engage against the upper margin of the clearance opening 47 to limit displacement of the pressure plate 50 in the direction away from the body wall at 16. End 52 of plate 50 can be forced down into assembled position.

The pressure plate 50 is formed at a location between its ends with a portion 56 that is contoured to fit against the inner side of the ball 32. This contoured portion presents a spherically concave surface which is pressed against the ball surface, thus imposing frictional resistance against relative movement of the two surfaces, when the pressure plate is held in place under tension.

The pressure plate, or ball clamping member, has tension applied to it through the tensioning screw 60. The screw 60 has a head 61 to seat in a socket 39 formed in the ball seat member 34. The shank of the screw 60 extends through an opening in the socket and an aligned opening in base portion 41 of the body clamp 40, and then is threaded through an opening in the pressure plate 50 at a location between the contoured portion 56 and the upturned end 52 of this plate. The screw head 61 thus is located outside the body wall 16, where it is accessible for turning the screw and adjusting the tension applied through it to the pressure plate.

It will be apparent that a tightening of the screw 60 will draw the loose end of the pressure plate closer to the body clamp 40 and wall portion 16, thus increasing the pressure of the contoured portion 56 of plate 50 against the inner side of the ball 32 and consequently increasing the frictional resistance of the engaged plate and ball surfaces against movement of the mirror head 10 relative to the supporting ball member and the mirror base to which it is fixed.

In the event of the screw 60 becoming loose or falling out of the clamping assembly, which may occur as a consequence of tampering with the screw or of vibrations in the use of the rearview mirror assembly, the pressure of the ball clamping member 50 against the mirror supporting ball 32 will be reduced or may be lost altogether. Nonetheless, by virtue of the confinement of the lip 53 of plate 50 in the clearance opening 47 of leg 46, the ball clamping member is kept in a position for easy reengagement with a fitting tensioning screw 60.

It will be understood that the new features of the present invention, which are intended to be defined by the appended claims, may be embodied and utilized in forms and ways differing from those of the preferred embodiment illustrated in the drawings and described hereinabove.

I claim:

1. In a ball joint for holding a body such as a mirror housing positioned tightly yet turnably relative to a supporting member carrying a ball disposed in an opening through a wall of the body, a clamping assembly comprising:

a ball seat member cradling the outer side of said ball and fixed against the outer side of said wall about said opening;

a body clamp fixed against the inner side of said wall about said opening;

a ball clamping member at the inner side of said wall to bear against the inner side of said ball;

means including an element engageable with said clamp-member and adjustable from outside said wall for holding said ball clamping member under a desired tension against said ball;

and coacting means on said body clamp and said ball clamping member for preventing displacement of the latter away from a position for engagement with said holding element and said ball in the event of disengagement of said element from said clamping member.

2. A ball joint according to claim 1, said body clamp comprising a substantially rigid bracket having upstanding legs extending from a base portion thereof at opposite sides of said wall opening, said ball clamping member comprising a substantially rigid yet resilient pressure plate having a portion thereof contoured to fit against said ball, having one end thereof engaged with one of said legs and having the opposite end thereof engaged loosely with the other of said legs so as to be displaceable relative thereto in the direction toward said wall.

3. A ball joint according to claim 2, said holding means comprising a tensioning screw having its head outside said wall, said screw extending through openings in said seat member and said base portion and being threaded in an opening in said plate at a location between said contoured portion and said displaceable end of said plate.

4. A ball joint according to claim 2 or claim 3, said coacting means comprising a clearance opening in said other leg and a lip on said displaceable end that protrudes laterally into said clearance opening and will engage an upper margin thereof to limit displacement of said plate in the direction away from said wall.

5. A ball joint according to claim 2 or claim 3, said ball seat member and said base portion of said bracket being joined together against the opposite sides of portions of said wall bordering said wall opening.

6. A ball joint according to claim 5, said seat member and said base portion being so joined by rivets extending between them in corners of said wall opening.

7. In a rear view mirror assembly comprising a wall forming a mirror head, a mirror mounted in said head, said wall having an opening therein to receive a supporting ball, mirror mounting means including a mounting bracket, a stud support on said bracket, a ball stud fixed to said support and carrying a ball disposed in said wall opening, and means for clamping said mirror head tightly yet turnably on said ball, the improvement wherein said clamping means comprises:

a ball seat member cradling the outer side of said ball and fixed against the outer side of said wall about said opening;

a body clamp fixed against the inner side of said wall about said opening;

a ball clamping member at the inner side of said wall to bear against the inner side of said ball, means adjustable from outside said wall for holding said clamping member under a desired tension against said ball;

and coacting means on said body clamp and said clamping member for preventing displacement of the latter away from a position for engagement with said holding means and said ball;

said body clamp comprising a substantially rigid bracket having upstanding legs extending from a base portion thereof at opposite sides of said wall opening;

said ball clamping member comprising a substantially rigid yet resilient pressure plate having a portion thereof contoured to fit against said ball, having one end thereof pivotably engaged with one of said legs and having the opposite end thereof engaged loosely with the other of said legs so as to be displaceable relative thereto in the direction toward said wall;

said holding means comprising a tensioning screw having its head outside said wall, said screw extending through openings in said seat member and said base portion and being threaded in an opening in said plate at a location between said contoured portion and said displaceable end of said plate;

said coacting means comprising a clearance opening in said other leg and a lip on said displaceable end that protrudes laterally into said clearance opening and will engage an upper margin thereof to limit displacement of said plate in the direction away from said wall.

8. A mirror assembly according to claim 7, said ball seat member and said base portion of said bracket being joined together against the opposite sides of portions of said wall that border said wall opening by rivets extending between them in corners of said wall opening.

* * * * *